(12) United States Patent
Chang

(10) Patent No.: US 7,714,952 B2
(45) Date of Patent: May 11, 2010

(54) BACKLIGHT ASSEMBLY AND LIQUID CRYSTAL DISPLAY APPARATUS HAVING THE SAME

(75) Inventor: Woong-Jae Chang, Suwon-si (KR)

(73) Assignee: Samsung Electronics Co., Ltd. (KR)

( * ) Notice: Subject to any disclaimer, the term of this patent is extended or adjusted under 35 U.S.C. 154(b) by 546 days.

(21) Appl. No.: 11/471,260

(22) Filed: Jun. 20, 2006

(65) Prior Publication Data

US 2006/0290836 A1    Dec. 28, 2006

(30) Foreign Application Priority Data

Jun. 22, 2005    (KR) .................. 10-2005-0053857

(51) Int. Cl.
*G02F 1/1333* (2006.01)
*F21V 7/04* (2006.01)
(52) U.S. Cl. ..................... 349/58; 362/632
(58) Field of Classification Search ............ 349/58, 349/61, 65, 149, 187; 361/681, 679.26, 679.27; 362/632, 633, 634; 445/24; 345/905

See application file for complete search history.

(56) References Cited

U.S. PATENT DOCUMENTS

| | | | |
|---|---|---|---|
| 6,847,417 B2 * | 1/2005 | Kim ............................. | 349/58 |
| 7,178,967 B2 * | 2/2007 | Kim ............................ | 362/633 |
| 2004/0001330 A1 * | 1/2004 | Kang et al. .................... | 362/31 |
| 2004/0246397 A1 * | 12/2004 | Kang et al. .................... | 349/58 |

* cited by examiner

*Primary Examiner*—Dung Nguyen
*Assistant Examiner*—Tai Duong
(74) *Attorney, Agent, or Firm*—Cantor Colburn LLP

(57) ABSTRACT

A backlight assembly capable of reducing a frame size, and a liquid crystal display (LCD) apparatus having the backlight assembly is provided. The backlight assembly includes a bottom chassis having a receiving space, a lamp unit disposed at an edge portion of the receiving space, a light-guide plate disposed on the receiving space and an optical sheet. The lamp unit includes a light-emitting lamp a lamp cover covering a portion of the lamp and a sheet-fixing part that protrudes in an upward direction. The light-guide plate guides light from the lamp unit toward an upward direction. The optical sheet includes a fixing hole in which the sheet-fixing part is be inserted.

14 Claims, 9 Drawing Sheets

BACKLIGHT ASSEMBLY AND LIQUID CRYSTAL DISPLAY APPARATUS HAVING THE SAME

This application claims priority to Korean Patent Application No. 2005-53857 filed on Jun. 22, 2005 and all the benefits accruing therefrom under 35 U.S.C. §119, the contents of which are herein incorporated by reference in its entirety.

BACKGROUND OF THE INVENTION

1. Field of the Invention

The present invention relates to a backlight assembly and a liquid crystal display apparatus having the backlight assembly. More particularly, the present invention relates to a display apparatus capable of reducing a frame size of the backlight assembly and a liquid crystal display apparatus having the backlight assembly.

2. Description of the Related Art

In general, a liquid crystal display (LCD) apparatus displays images by using liquid crystal having optical and electrical properties, such as an anisotropic refractive index, an anisotropic dielectric constant, etc. The LCD apparatus has various advantages, such as relatively thinner thickness, relatively lighter weight, relatively lower power consumption, relatively lower driving voltage, etc., in comparison with other types of display apparatuses, such as a cathode ray tube (CRT), a plasma display panel (PDP) and so on. Therefore, the LCD device is used in various fields.

The LCD apparatus includes an LCD panel. The LCD panel includes a thin-film transistor (TFT) substrate, a color filter substrate facing the TFT substrate and a liquid crystal layer disposed between the TFT substrate and the color filter substrate. When electric fields are applied to the liquid crystal layer, an arrangement of the liquid crystal molecules of the liquid crystal layer is altered to change optical transmissivity. As a result, images are displayed.

Also, an LCD apparatus requires a backlight assembly that provides the LCD panel with light, since the LCD panel of the LCD apparatus is not self-emissive.

The backlight assembly includes a lamp unit, a light-guide plate and at least one optical sheet. The lamp unit includes a lamp that generates light and a lamp cover that covers the lamp to protect the lamp. The light-guide plate receives light generated by the lamp to guide the light toward the LCD panel. The optical sheet is disposed over the light-guide plate, and the optical sheet enhances the optical properties of the light. The backlight assembly further includes a bottom chassis and a middle frame to receive the lamp unit, the light-guide plate and the optical sheet.

According to a conventional LCD apparatus, the LCD panel is disposed on the backlight assembly, and a top chassis is combined with the LCD panel, to protect the LCD panel.

Accordingly, there are three layers including a bottom chassis, a middle frame and a top chassis on the lateral side portions of the LCD apparatus. As a result, the frame size is increased. The frame size is further increased by an additional fixing member to fix the optical sheet to the bottom chassis.

SUMMARY OF THE INVENTION

In one exemplary embodiment provides a backlight assembly capable of decreasing the entire frame size.

Another exemplary embodiment provides a liquid crystal display apparatus (LCD) having the backlight assembly.

In another exemplary embodiment, a backlight assembly includes a bottom chassis, a lamp unit, a light-guide plate and an optical sheet. The bottom chassis has a receiving space. The lamp unit is disposed at an edge portion of the receiving space and includes a lamp emitting light, a lamp cover covering a portion of the lamp and a sheet-fixing part protruding in an upward direction. The light-guide plate is disposed in the receiving space and guides the light from the lamp unit toward an upward direction. The optical sheet is disposed on the light-guide plate and includes a fixing hole for the sheet-fixing part to be inserted.

In another exemplary embodiment, an LCD apparatus includes a bottom chassis, a light-emitting unit, an optical sheet, a middle frame, a display unit and a top chassis. The bottom chassis includes a receiving space formed by sidewalls substantially vertically extended from edge portions of the bottom plate. The sidewalls have a first and a second hook part protruding into the receiving space. The light-emitting unit is received in the receiving space. The optical sheet is disposed on the light-emitting unit. The middle frame fixes edge portions of the optical sheet by combining with the first hook part. A display unit includes an LCD panel disposed on the middle frame and a driving circuit part connected with the LCD panel. The top chassis fixes edge portions of the LCD panel by being combined with the second hook part. The top chassis includes opening portions comprising opening portions corresponding to sidewalls of the bottom chassis, except for a sidewall of the bottom chassis where the driving circuit part is disposed.

In another exemplary embodiment of the backlight assembly and the LCD apparatus, sizes of the backlight assembly and the LCD apparatus may be reduced.

BRIEF DESCRIPTION OF THE DRAWINGS

The above and other advantages of the present invention will become readily apparent by reference to the following detailed description when considered in conjunction with the accompanying drawings wherein.

DETAILED DESCRIPTION OF THE INVENTION

Figure 1:
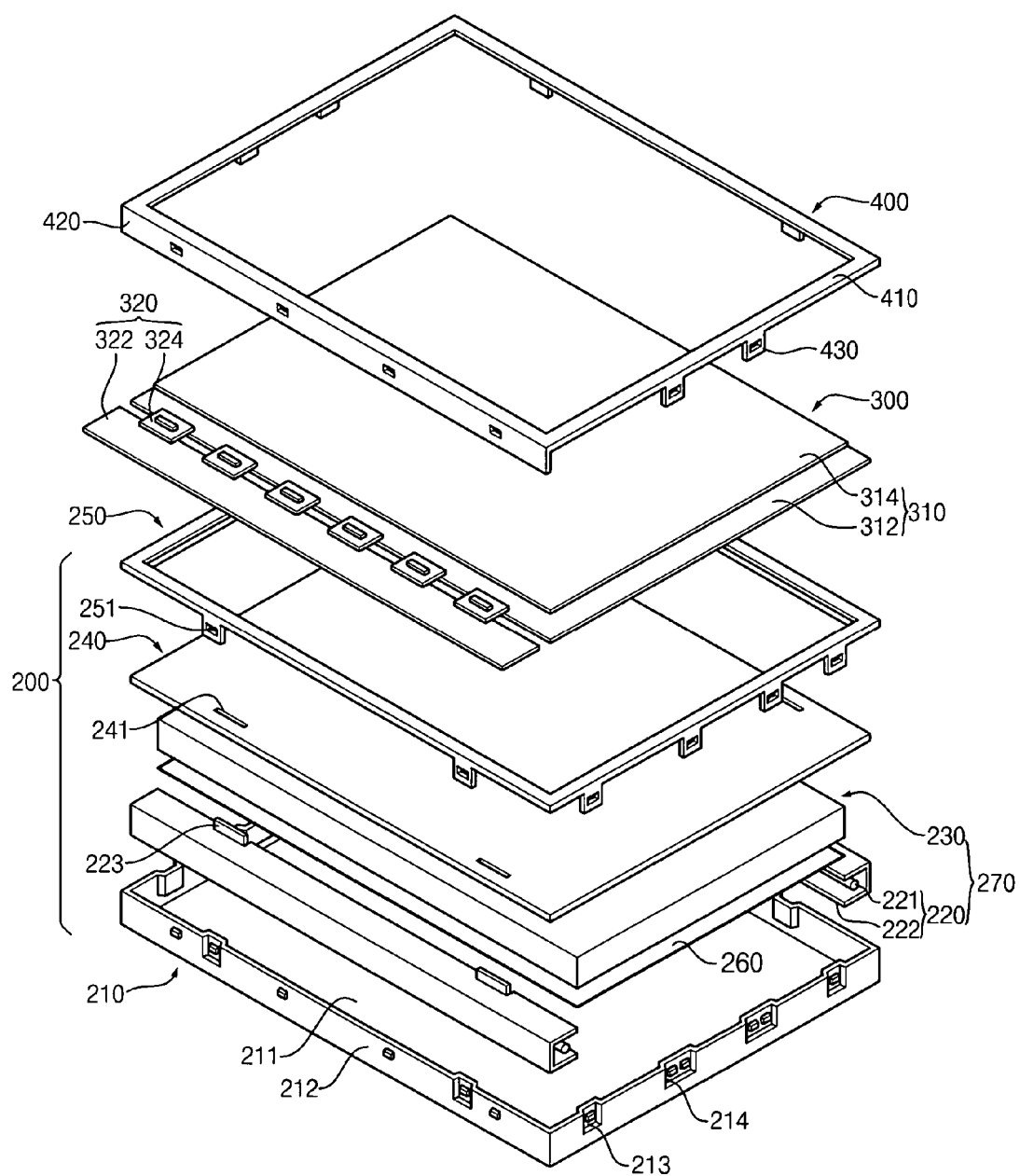
FIG. 1 is an exploded perspective view illustrating an exemplary embodiment of a liquid crystal display apparatus (LCD) according to the present invention.

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. In the drawings, the size and relative sizes of layers and regions may be exaggerated for clarity.

It will be understood that when an element or layer is referred to as being "on," "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numbers refer to like elements throughout. As used herein, the term "and/or" includes any and all combinations of one or more of the associated listed items.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

Spatially relative terms, such as "lower," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "lower" relative to other elements or features would then be oriented "upper" relative to the other elements or features. Thus, the exemplary term "lower" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the invention are described herein with reference to cross-section illustrations that are schematic illustrations of idealized embodiments (and intermediate structures) of the invention. As such, variations from the shapes of the illustrations as a result, for example, of manufacturing techniques and/or tolerances, are to be expected. Thus, embodiments of the invention should not be construed as limited to the particular shapes of regions illustrated herein but are to include deviations in shapes that result, for example, from manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region in between the buried region and the surface through which the implantation takes place. Thus, the regions illustrated in the figures are schematic in nature and their shapes are not intended to illustrate the actual shape of a region of a device and are not intended to limit the scope of the invention.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

FIG. 1 is an exploded perspective view illustrating an exemplary embodiment of a liquid crystal display (LCD) apparatus according to the present invention.

Referring to FIG. 1, an LCD apparatus 100 includes a backlight assembly 200, a display unit 300 and a top chassis 400. The backlight assembly 200 provides the display unit 300 with light. The display unit 300 displays images by using the light provided by the backlight assembly 200. The top chassis 400 fastens the display unit 300 to the backlight assembly 200.

The backlight assembly 200 includes a bottom chassis 210, a light-emitting unit 270 and at least one optical sheet 240.

The bottom chassis 210 includes a bottom plate 211 and a sidewall 212 substantially vertically extended from edge portions of the bottom plate 211 to define a receiving space. The bottom chassis 210 may include metal having excellent strength and low deformation characteristics.

The sidewall 212 of the bottom chassis 210 includes a first hook part 213, which is a groove protruding into the receiving space for being combined with a middle frame 250, and a second hook part 214, which is a groove protruding into the receiving space for being combined with the top chassis 400.

The light-emitting unit 270 is received in the receiving space of the bottom chassis 210 and includes a lamp unit 220 and a light-guide plate 230.

The lamp unit 220 is disposed at an edge portion of the receiving space of the bottom chassis 210. In exemplary embodiments, the lamp unit 220 may be disposed at each of opposite side portions of the receiving space. In other words, the lamp unit 220 is disposed at both of the side portions of the light-guide plate 230 to face each other. In alternative exemplary embodiments, the lamp unit 220 may be disposed at only one side portion of the light-guide plate 230.

The lamp unit 220 includes a light-emitting lamp 221 and a lamp cover 222 covering the lamp 221. The lamp 221 is disposed inside the lamp cover 222. Where the LCD display apparatus is required to have a large size or a high degree of luminance, more than one lamp 221 may be disposed inside the lamp cover 222.

The lamp 221 generates light in response to a driving power source from an external inverter (not shown). In exemplary embodiments, the lamp 221 may include a cold cathode fluorescent lamp (CCFL) having a thin and long cylindrical shape. In alternative exemplary embodiments, the lamp 221 may include an external electrode fluorescent lamp (EEFL) having an external electrode.

The lamp cover 222 protects the lamp 221 by covering the lamp 221. The lamp cover 222 may include metal having high reflectivity or a structure in which a material of high reflectivity is coated inside of metal. The lamp cover 222 enhances light-use efficiency by reflecting light generated from the lamp 221 toward the light-guide plate 230.

The lamp cover 222 has a sheet-fixing part 223 protruded in a substantially vertical or upward direction towards the display unit 300 to dispose the optical sheet 240.

The light-guide plate 230 is received in the receiving space of the bottom chassis 210, guides a light from the lamp unit 220, which is disposed at a lateral side portion, toward an upward direction. The light-guide plate 230 may have a transparent material for guiding light. In one exemplary embodiment, the light-guide plate 230 includes polymethyl methacrylate (PMMA).

A lower surface of the light-guide plate 230 includes a certain reflecting pattern (not shown) for scattering the light. In one exemplary embodiment, the scattering pattern may include a printing pattern or a convexo-concave pattern. Light from the lamp unit 220 entering the light-guide plate 230 is scattered by the reflecting pattern, and light above a specific critical angle exits through a top surface of the light-guide plate 230.

The optical sheet 240 is disposed on a light-guide plate 230. The optical sheet 240 has a fixing hole 241 through which the sheet-fixing part 223 is inserted. The optical sheet 240 is essentially positioned onto the light-guide plate 230 by combining the sheet-fixing part 223 and the fixing hole 241.

The optical sheet 240 enhances luminance properties of the light exiting from the light-guide plate 230. The optical sheet 240 may include a diffusion sheet that diffuses the light exiting from the light-guide plate 230 to enhance luminance uniformity. In one exemplary embodiment, the optical sheet 240 may include a prism sheet (not shown) condensing light exiting from the light-guide plate 230 toward an upward direction, that is, towards a front of the LCD display apparatus, for enhancing luminance of light when viewed from the front. In another exemplary embodiment, the optical sheet 240 may include a reflecting polarized sheet (not shown) enhancing luminance of light by transmitting the light having some specific conditions and reflecting the remaining light having other conditions. In another exemplary embodiment, the backlight assembly 200 may include various functional optical sheets according to required luminance properties.

The backlight assembly 200 may further include the middle frame 250 that is combined with the bottom chassis 210 and fixes an edge portion of the optical sheet 240.

The middle frame 250 includes a third hook part 251 that may be combined with the first hook part 213 of the bottom chassis 210. In one exemplary embodiment, the third hook part 251 combined with the first hook part 213 is not laterally protruded further than the sidewall 212 of the bottom chassis 210, since the first hook part 213 is a groove that is recessed towards the receiving space.

The backlight assembly 200 may further include a reflecting sheet 260 disposed under the light-guide plate 230.

The reflecting sheet 260 reflects the light leaking toward a lower part of the light-guide plate 230 and redirects the light into the light-guide plate 230, enhancing light efficiency. In one exemplary embodiment, the reflecting sheet 260 includes polyethylene terephthalate (PET) or polycarbonate (PC), which may be white.

The display unit 300 includes an LCD panel 310 showing images by using light from the backlight assembly 200, and a driving circuit part 320 for driving the LCD panel 310.

The LCD panel 310 is disposed on the middle frame 250. The LCD panel 310 includes a first substrate 312, a second substrate 314 coupled to the first substrate 312 and a liquid crystal layer (not shown) interposed between the first substrate 312 and the second substrate 314.

The first substrate 312 may include a thin-film transistor (TFT) substrate. The TFT is a switching element and a plurality of TFTs may be formed in a matrix configuration. In one exemplary embodiment, the first substrate 312 may include a transparent material for transmitting the light. Each of data lines and gate lines is connected to a source terminal and a gate terminal of the TFTs and a drain terminal is connected to a pixel electrode including a transparent conductible material.

The second substrate 314 may be a color filter substrate, on which color pixels may be formed. In one exemplary embodiment, the color pixels may include red, green and blue color pixels for showing colors. The color pixels may be formed in as a thin layer shape. In another exemplary embodiment, the second substrate 314 may include a transparent glass material. In another exemplary embodiment, a common electrode (not shown), that may include a transparent conductible material, may be formed on the second substrate 314.

When the TFT is turned on by applying a power source to a gate terminal, electric fields are generated between a pixel electrode (not shown) and the common electrode. An arrangement of liquid crystal molecules between the first substrate 312 and the second substrate 314 is changed by the electric fields. Due to this change, light permeability from the backlight assembly 200 is altered, thereby allowing images with a desired gradation to be displayed.

The driving circuit part 320 includes a printed circuit board (PCB) 322 outputting various control signals for driving the LCD panel 310 and a driving circuit film 324 connecting the LCD panel 310 and the PCB 322.

The driving circuit film 324 may include a driving chip (not shown) outputting a driving signal for driving the LCD panel 310 in response to a control signal that is output from the PCB 322.

In one exemplary embodiment, the driving circuit film 324 may include a tape carrier package (TCP) or a chip-on-film (COF).

The PCB 322 is ultimately disposed on a lower surface of the bottom chassis 210 by bending of the driving circuit film 324. The driving circuit film 324 is disposed between the sidewall 212 of the bottom chassis 210 and a sidewall 420 of the top chassis 400.

In one exemplary embodiment, the LCD panel 310 may include a structure in which the first substrate 312 includes a gate driving circuit (not shown) for driving gate lines. The display unit 300 does not include a separate PCB and a driving circuit film for driving the gate lines. In an alternative exemplary embodiment, when the LCD panel 310 has a structure in which the first substrate 312 does not include a gate driving circuit, the LCD panel 310 may include a separate driving circuit film connected with the gate lines.

The top chassis 400 fastens an edge portion of the LCD panel 310 by being combined with the bottom chassis 210. The top chassis 400 includes a fourth hook part 430 combined with the second hook part 214 of the bottom chassis 210. In one exemplary embodiment, because the second hook part 214 is considered a groove that is recessed towards the receiving space, the fourth hook part 430 combined with the second hook part 214 is not laterally protruded further than the sidewall 212 of the bottom chassis 210.

A sidewall area of the top chassis 400 corresponding to the sidewall 212 of a bottom chassis 210, excluding the sidewall 212 where the driving circuit part 320 is disposed, has an opened structure for reducing a frame size of the LCD apparatus 100. As illustrated in FIG. 1, the sidewall area of the top chassis 400 that includes the fourth hook part 430, is considered to have the opened structure.

Figure 2:
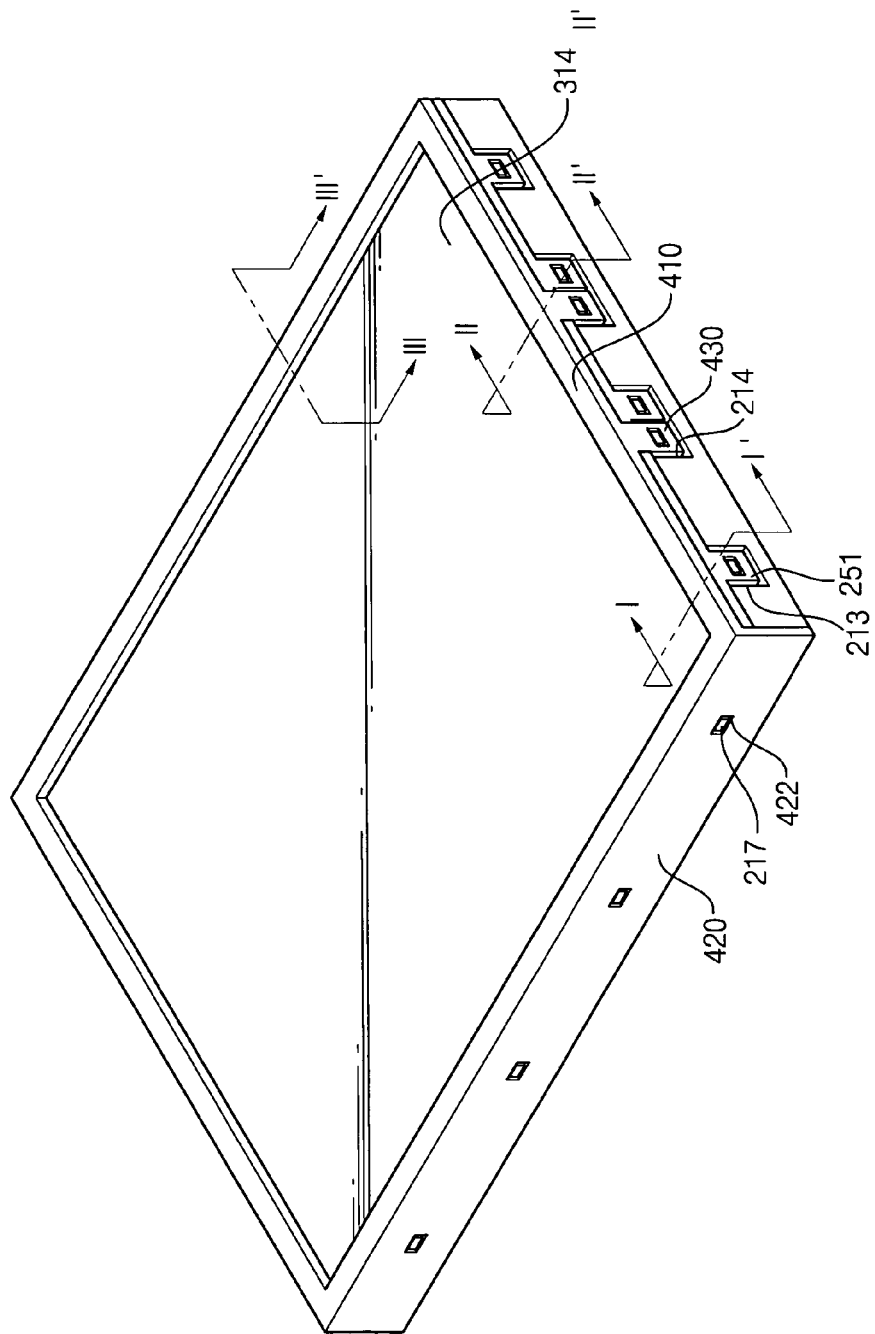
FIG. 2 is a perspective view illustrating an exemplary embodiment of a backlight assembly in FIG. 1.
Figure 3:
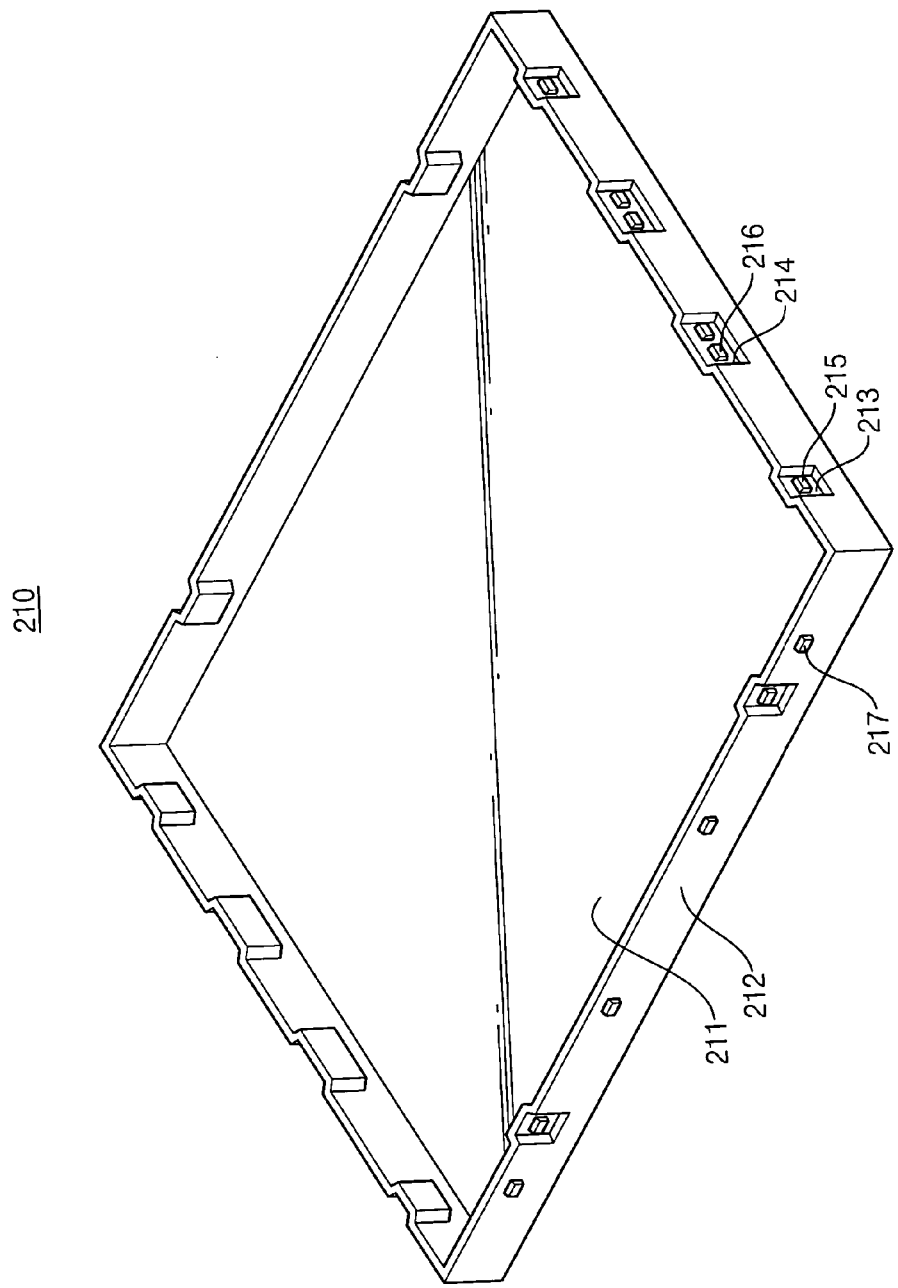
FIG. 3 is a perspective view illustrating an exemplary embodiment of a bottom chassis in FIG. 1.

FIG. 2 is a perspective view illustrating an exemplary embodiment of a combined state of a backlight assembly shown in FIG. 1; FIG. 3 is a perspective view illustrating an exemplary embodiment of a bottom chassis shown in FIG. 1; and FIG. 4 is a perspective view illustrating an exemplary embodiment of a top chassis shown in FIG. 1.

Figure 4:
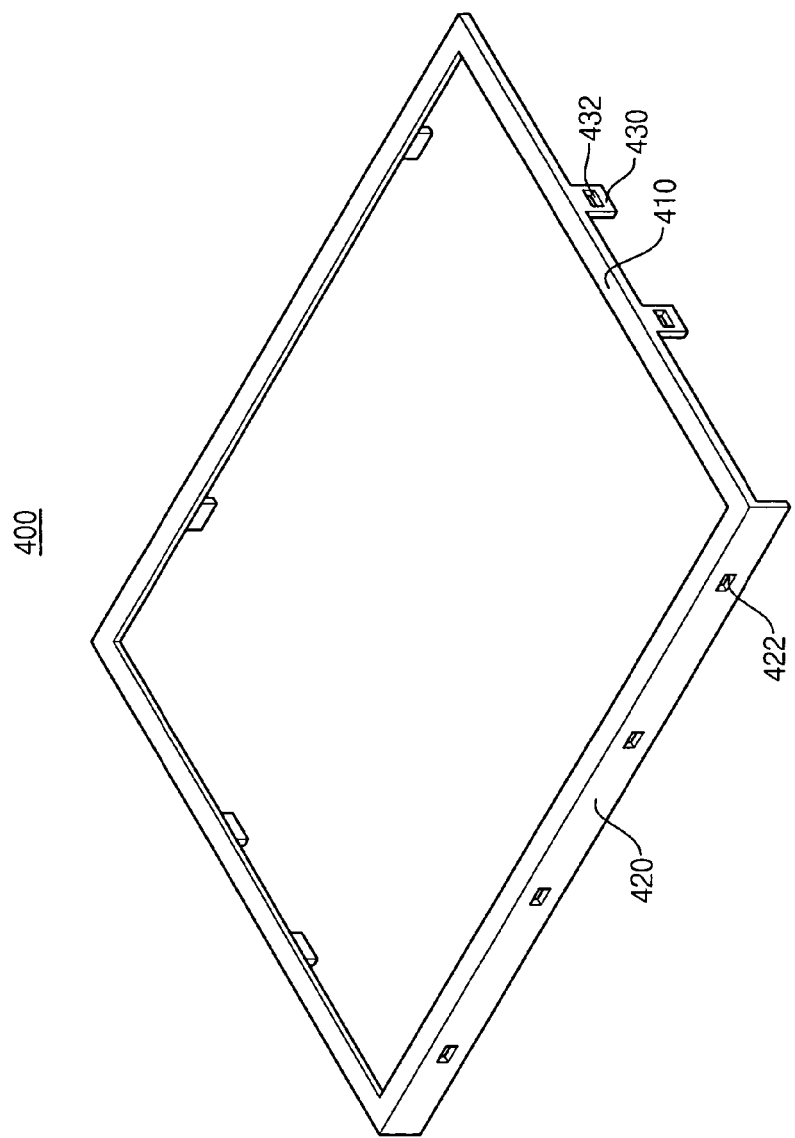
FIG. 4 is a perspective view illustrating an exemplary embodiment of a top chassis in FIG. 1.

Referring to FIGS. 2 through 4, the bottom chassis 210 includes the sidewall 212 substantially vertically extended from edge portions of the bottom plate 211.

As shown in FIG. 3, the sidewall 212 of the bottom chassis 210 includes the first hook part 213 for combining with the middle frame 250 and the second hook part 214 so that the bottom chassis 210 may be combined with the top chassis 400.

All of the four sidewalls 212 include the first hook part 213, while just three of the sidewalls 212, excluding the sidewall 212 where the driving circuit part 320 is disposed, include the second hook part 214. In exemplary embodiments, the first hook part 213 and the second hook part 214 may be formed to be separate from each other or may be formed to be adjacent to each other.

The first hook part 213 and the second hook part 214 are formed as grooves that are recessed towards the receiving space. In other words, the first hook part 213 and the second hook part 214 inwardly protrude further than the sidewall 212, that is, are disposed within an outer surface of the sidewall 212.

A first projection 215 is formed in the first hook part 213 and a second projection 216 is formed in the second hook part 214.

The first projection 215 and the second projection 216 protrude from an external surface of the first hook part 213 and the second hook part 214, respectively, to inwardly protrude further than the sidewall 212 such that the first projection 215 and the second projection 216 are also within an outer surface of the sidewall 212.

A third projection 217 for being combined with the top chassis 400 is formed on the sidewall 212 of the bottom chassis 210 on which the driving circuit part 320 is disposed.

As shown in FIG. 4, the top chassis 400 includes a top surface 410, the sidewall 420 and the fourth hook part 430.

The top surface 410 covers edge portions of the top of the LCD panel 310 disposed in the middle frame 250.

The sidewall 420 is substantially vertically extended from a top surface 410. In one exemplary embodiment, the sidewall 420 is only formed in the place corresponding to the sidewall 212 of the bottom chassis 210 in which the driving circuit part 320 is disposed. The sidewall 420 is combined with the sidewall 212 of the bottom chassis 210 for protecting the driving circuit film 324, which is disposed on the sidewall 212 of the bottom chassis 210. The driving circuit film 324 is disposed between the sidewall 212 of the bottom chassis 210 and the sidewall 420. A first combining hole 422, which is for combining with the third projection 217 of the bottom chassis 210, is formed through the sidewall 420. While four of the third projection 217 and the combining hole 422 are illustrated, any of a number of the third projection 217 and the combining hole 422 may be used as is suitable for the purpose of combining the top chassis 400 and the bottom chassis 210.

Three of the sidewalls 420, except for the sidewall 420 corresponding to the sidewall 212 of the bottom chassis 210 where the driving circuit part 320 is disposed, include the fourth hook part 430. In other words, the fourth hook part 430 is formed at the place corresponding to the second hook part 214 of the bottom chassis 210. A second combining hole 432, which is for being combined with the second projection 216 of the second hook part 214, is formed through the fourth hook part 430.

Referring to FIGS. 2 and 3, the second hook part 214 includes the first projection 215 and the second projection 216. The first projection 215 of the second hook part 214 is adjacent to the second projection 216 and corresponding to a position of the third hook part 251 and the fourth hook part 430 of the middle frame 250 and top chassis 400, respectively. The second hook part 214 is configured such that both the middle frame 250 and the top chassis 400 may be fastened to the bottom chassis 210 with minimal distance between a top surface of the middle frame 250 and the top chassis 400, reducing an overall thickness of the LCD apparatus 100. While the first projection 215 and the second projection 216 are contained in a single recessed hook part (second hook part 214), the projections of the bottom chassis 210 may be configured in any of a number of arrangements such that both the third hook part 251 of the middle frame 250 and the fourth hook part 430 of the top chassis 400 may be accommodated by the bottom chassis 210. In one exemplary embodiment, each projection of the bottom chassis 210 may include its own recessed hook part to coincide with a corresponding position of the hook parts of the middle frame 240 and the top chassis 400.

When the second hook part 214 and the fourth hook part 430 are combined, the second hook part 214 is a groove that is recessed towards the receiving space. The fourth hook part 430 combined with the second hook part 214 does not laterally protrude further than the external surface of the sidewall 212 of the bottom chassis 210.

As discussed above, sidewall areas of the top chassis 400 include an opened structure except for the fourth hook part 430 and the sidewall 420 corresponding to the driving circuit part 320. The sidewall areas of the top chassis correspond to the sidewalls 212, except for the sidewall 212 of the bottom chassis 210 where the driving circuit part 320 is disposed. Advantageously, an overall frame size of the LCD apparatus 100 may be decreased as a thickness of the top chassis 400 does not add to the overall thickness of the LCD apparatus 100, since the sidewall areas of the top chassis 400 include the open structure.

Figure 5:
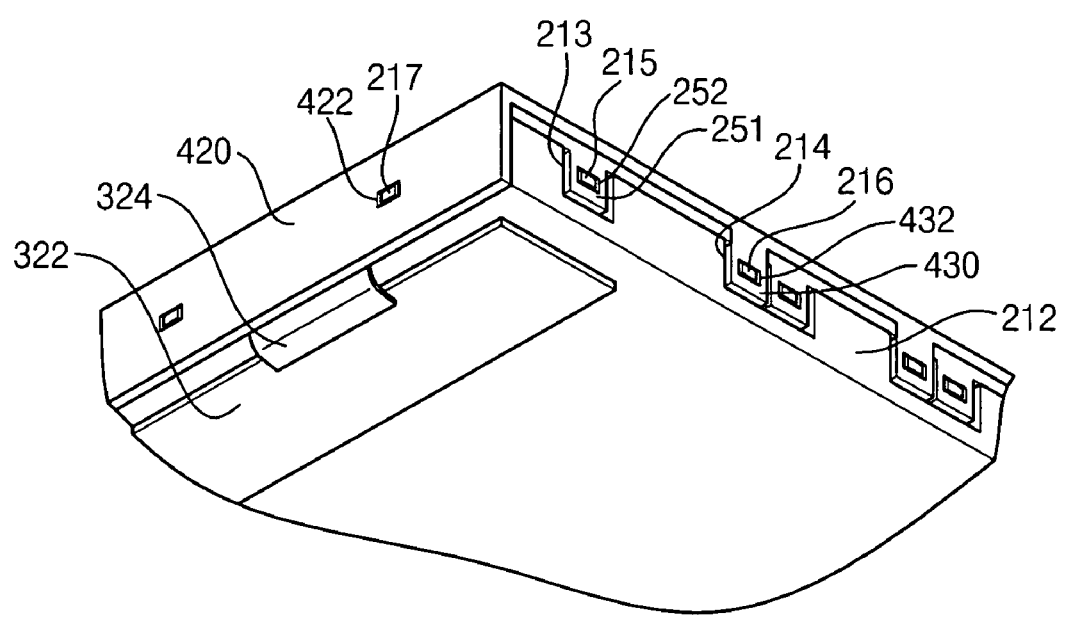
FIG. 5 is a perspective view illustrating an exemplary embodiment of a lower surface of the backlight assembly in FIG. 2.

FIG. 5 is a perspective view illustrating an exemplary embodiment of a lower surface of backlight assembly shown in FIG. 2.

Referring to FIG. 5, the middle frame 250 is combined with the bottom chassis 210 by combining the third hook part 251 with the first hook part 213 and the second hook part 214. Practically, the middle frame 250 is combined with the bottom chassis 210 by combining a third combining hole 252 and the first projection 215. The third combining hole 252 is formed in the third hook part 251. The first projection 215 is formed in the first hook part 213 and the second hook part 214.

Three opened sidewalls of the top chassis 400 are combined with the bottom chassis 210. The three opened walls of the top chassis 400 are combined with the bottom chassis 210 by combining the fourth hook part 430 and the second hook part 214. Practically, the second combining hole 432 of the fourth hook part 430 and the second projection 216 of the second hook part 214 are combined. As a result, the three opened walls of the top chassis 400 are combined with the bottom chassis 210.

The driving circuit film 324 is disposed between the sidewall 212 of the bottom chassis 210 and the sidewall 420 of the top chassis 400, and curves or is bent to the lower surface of the bottom chassis 210. The PCB 322 connected with a driving circuit film 324 is fastened on the lower surface of the bottom chassis 210 as shown in FIG. 5.

Figure 6:
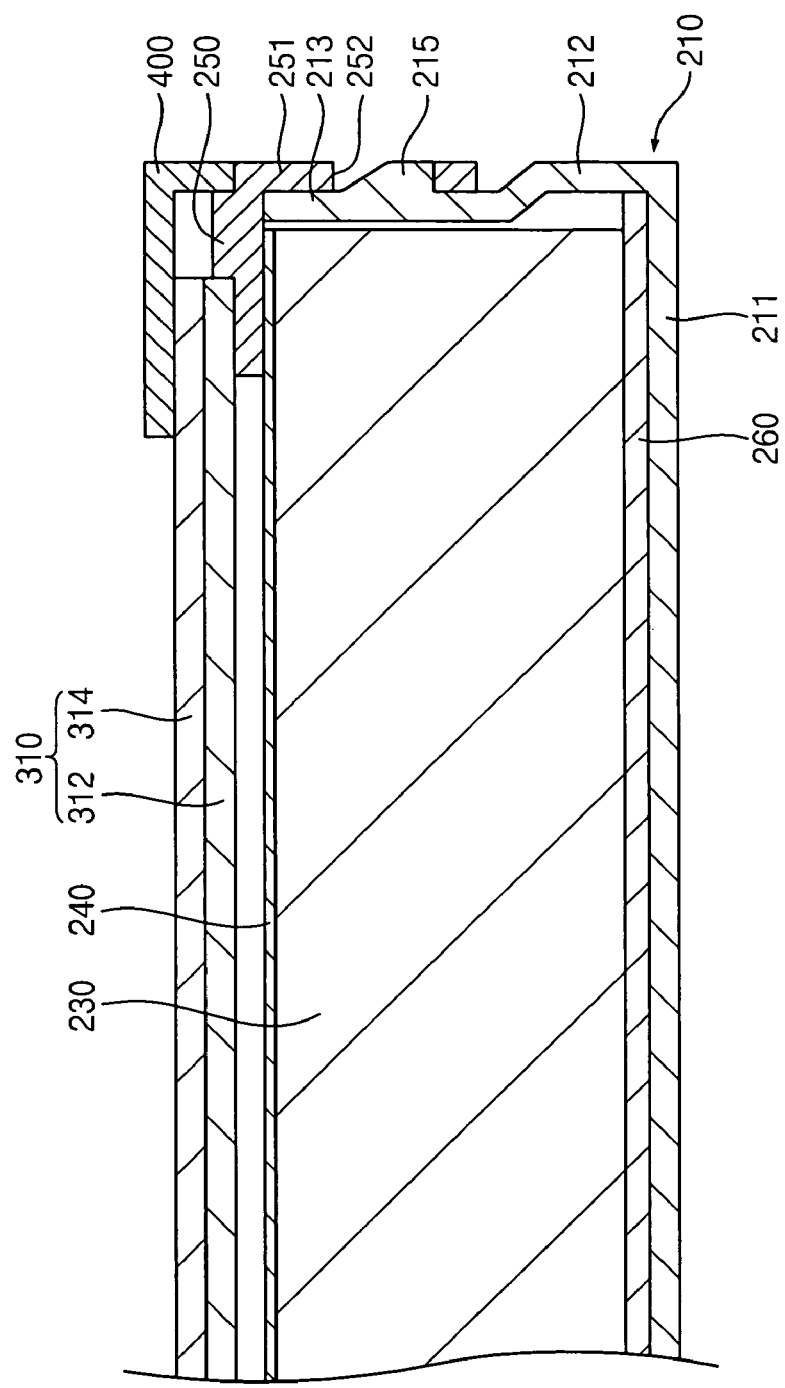
FIG. 6 is a cross-sectional view taken along line I-I' in FIG. 2.
Figure 7:
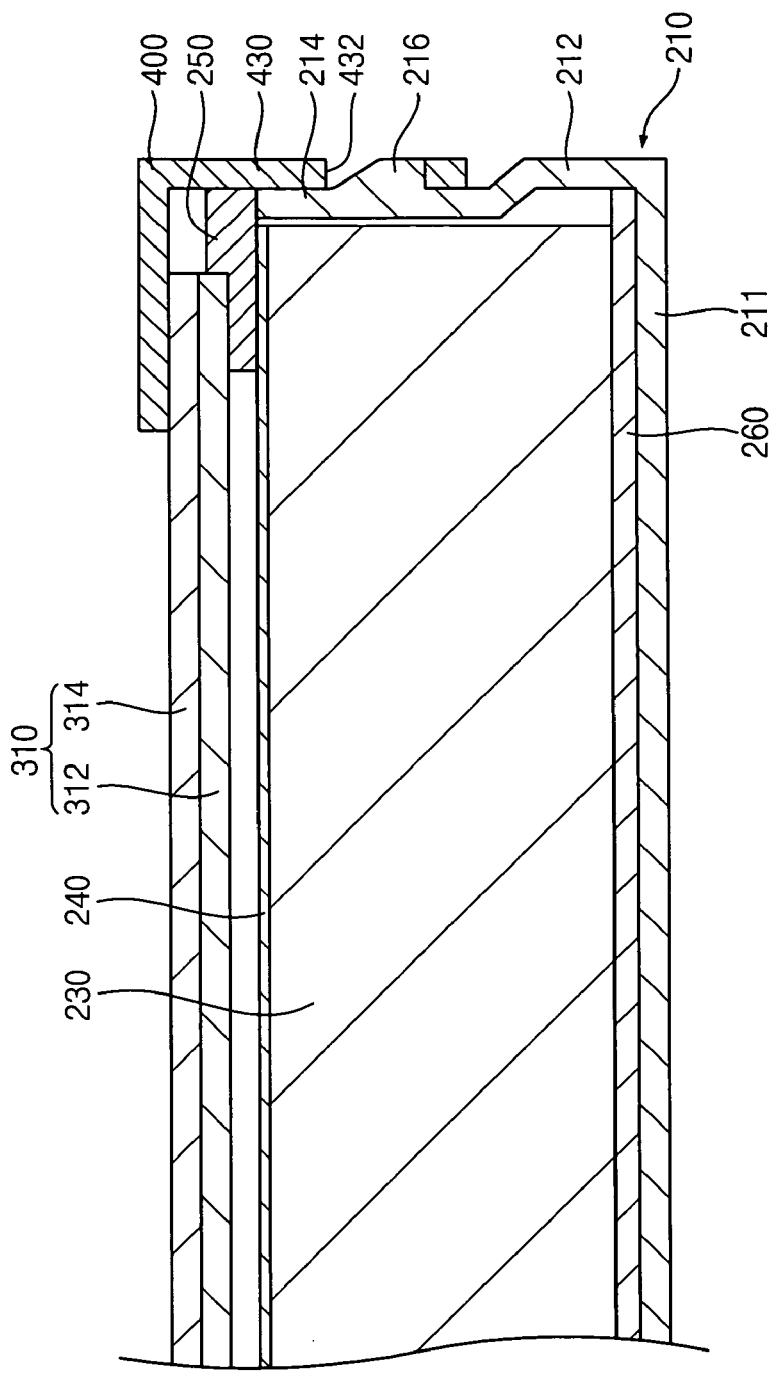
FIG. 7 is a cross-sectional view taken along line II-II' in FIG. 2.

FIG. 6 is a cross-sectional view taken along line I-I' in FIG. 2, and FIG. 7 is a cross-sectional view taken along line II-II' in FIG. 2.

Referring to FIG. 6 and FIG. 7, the reflecting sheet 260, the light-guide plate 230 and the optical sheet 240 are sequentially disposed inside the bottom chassis 210. The middle frame 250 accommodates the light-guide plate 230 and the optical sheet 240 by being combined with the bottom chassis 210. The top chassis 400 fastens the LCD panel 310 by being combined with the bottom chassis 210.

The middle frame 250 is combined with the bottom chassis 210 by combining the third combining hole 252 of the third hook part 251 and the first projection 215 of the first hook part 213 as shown in FIG. 6. The top chassis 400 is combined with the bottom chassis 210 by combining the second combining hole 432 of the fourth hook part 430 and the second projection 216 of the second hook part 214 as shown in FIG. 7.

Since the first hook part 213 and the second hook part 214 have a structure that is a groove that is recessed towards the receiving space of the bottom chassis 210, the first hook part 213 and the third hook part 251 combined with the second hook part 214 and the fourth hook part 430 are practically disposed in substantially the same plane relative to the sidewall 212 of the bottom chassis 210. Also, the sidewall areas of the top chassis 400 are opened except for the fourth hook part 430.

In one exemplary embodiment, stability of the LCD apparatus 100 may be maintained as the frame of an LCD apparatus 100 includes the bottom chassis 210 of metal material, which has good rigidity. Advantageously, by eliminating a number of the sidewalls of the top chassis 400 that are fully formed instead of a substantially opened structure, overall frame size may be reduced by as much as a thickness of the top chassis 400.

Figure 8:
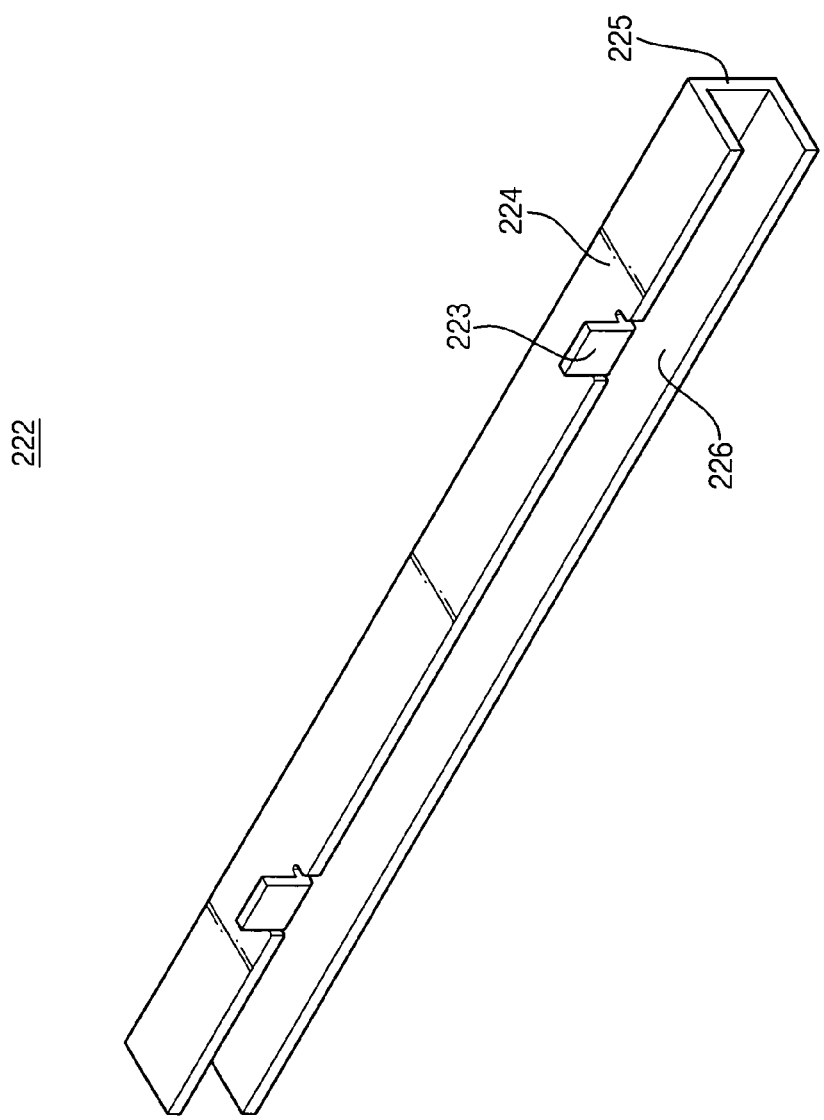
FIG. 8 is a perspective view illustrating a lamp cover in FIG. 1.
Figure 9:
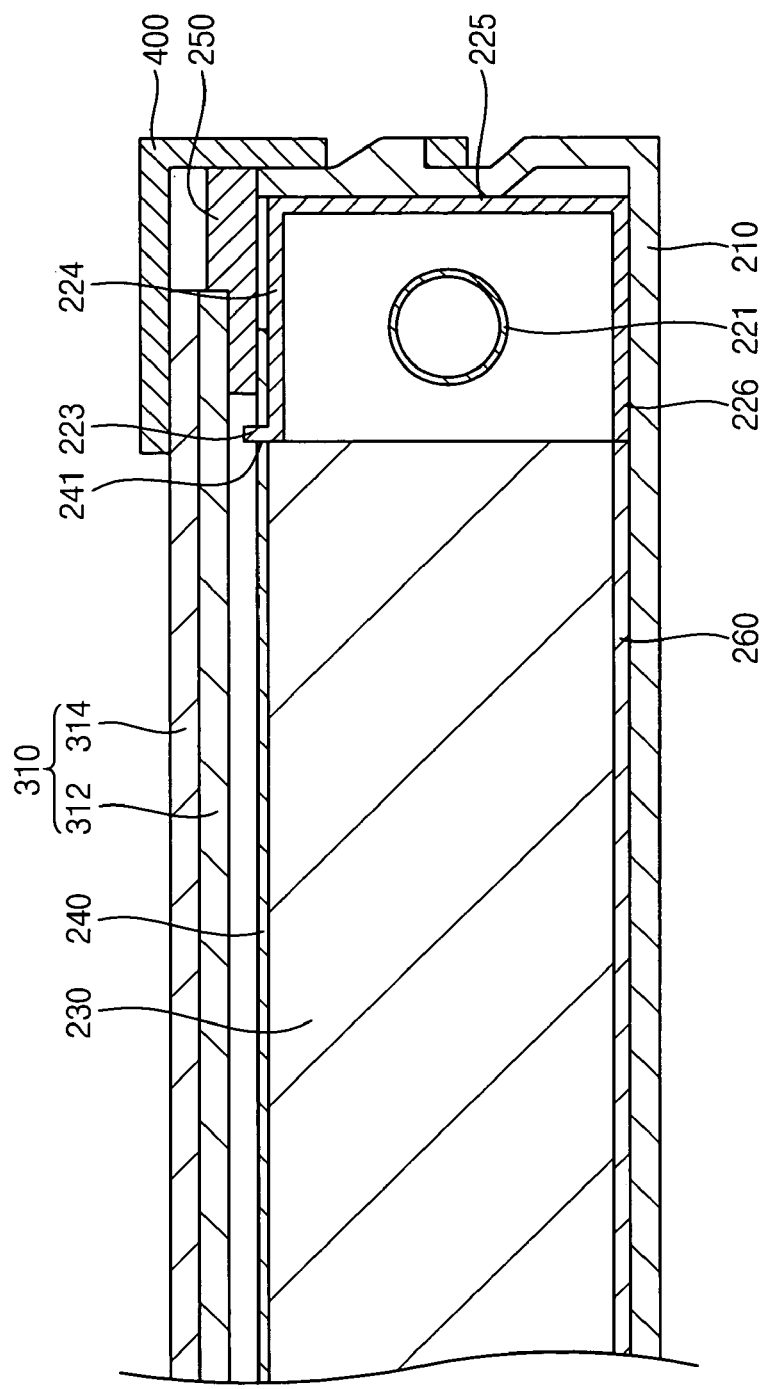
FIG. 9 is a cross-sectional view taken along line III-III' in FIG. 2.

FIG. 8 is a perspective view illustrating an exemplary embodiment of a lamp cover shown in FIG. 1, and FIG. 9 is a cross-sectional view taken along line II-II' in FIG. 2.

Referring to FIGS. 8 and 9, the lamp cover 222 includes a first cover part 224 covering an upper portion of the lamp 221, a second cover part 225 extended from the first cover part 224 covering a lateral portion of the lamp 221 and a third cover part 226, extended from the second cover part 225 covering a lower part of the lamp 221.

The lamp cover 222 includes the sheet-fixing part 223 for positioning the optical sheet 240. The sheet-fixing part 223 protrudes from an end portion of the first cover part 224 in an upward direction. In exemplary embodiments, at least one sheet-fixing part 223 is formed in the first cover part 224. In one exemplary embodiment, two sheet-fixing parts 223 may be formed in the first cover part 224.

In another exemplary embodiment, the sheet-fixing part 223 may have a shape substantially rectilinear, such as a stick, extending along an end portion of the first cover part 224 in a predetermined length. In an alternative exemplary embodiment, the sheet-fixing part 223 may include any of a variety if shapes as are suitable for securing the optical sheet 240 and corresponding with a shape and size of the fixing hold 241, such as a cylinder. In a preferred exemplary embodiment, the sheet-fixing part 223 may protrude higher than at least the thickness of the optical sheet 240 to stably dispose the optical sheet 240.

The optical sheet 240 has the fixing hole 241 for being combined with the sheet-fixing part 223. The fixing hole 241 is opened, and has a shape corresponding to the sheet-fixing part 223, so that the sheet-fixing part 223 of the lamp cover 222 may be inserted into the fixing hole 241.

The optical sheet 240 is initially combined on the light-guide plate 230 by combining the sheet-fixing part 223 and the fixing hole 241, and is finally fixed to the middle frame 250 that is disposed on the optical sheet 240.

Since the sheet-fixing part 223 essentially suspends the optical sheet 240 to the lamp cover 222, there may be no need to make extra shapes or elements to fasten the optical sheet 240 to the middle frame 250 or the bottom chassis 210. Advantageously, the frame size may further be prevented from increasing. Also, by forming a fixing hole 241 through the optical sheet 240, a shape of the optical sheet 240 may be simplified and defects that may be generated during a manufacturing or cutting procedure may be reduced.

In one exemplary embodiment of the backlight assembly and the LCD device having the backlight assembly according to the present invention, a frame of the LCD apparatus includes a bottom chassis including a metal material with strong rigidity, which may help to maintain stability of the LCD device structure. Eliminating lateral side portions of a top chassis may reduce a frame size of the LCD device to as much as a thickness of the top chassis.

In another exemplary embodiment according to the present invention, there is no need to make extra shapes to fix the optical sheet to a bottom chassis of a middle frame by forming a sheet-fixing part, which is for fixing an optical sheet in a lamp cover. Advantageously, a frame size of the backlight assembly and the LCD device may be further decreased.

In another exemplary embodiment according to the present invention, by forming a fixing hole through an optical sheet, a shape of the optical sheet may be simplified and defects that may be generated in a manufacturing process, such as in a cutting procedure, may be reduced.

Having described the example embodiments of the present invention and its advantages, it is noted that various changes, substitutions and alterations can be made herein without departing from the spirit and scope of the invention as defined by appended claims.

What is claimed is:

1. A liquid crystal display (LCD) apparatus comprising:
a bottom chassis comprising a receiving space formed by first, second, third, and fourth sidewalls substantially vertically extended from edge portions of a bottom plate;
a light-emitting unit received in the receiving space;
a middle frame combined with bottom chassis;
a display unit comprising an LCD panel disposed on the middle frame and a driving circuit part connected with the LCD panel and disposed on the first sidewall of the bottom chassis; and
a top chassis comprising a top surface covering edge portions of the LCD panel and a sidewall portion extending from an edge portion of the top surface, the sidewall portion of the top chassis comprising an opening portions which corresponds to at least one of the second, third and fourth sidewalls of the bottom chassis.

2. The LCD apparatus of claim 1, wherein the sidewalls of the bottom chassis comprises a first hook part and a second hook part recessed towards the receiving space,
the middle frame is combined with the first hook part, and
the top chassis is combined with the second hook part.

3. The LCD apparatus of claim 2, further comprising an optical sheet disposed on the light emitting unit,
wherein the middle frame fastens edge portions of the optical sheet.

4. The LCD apparatus of claim 3, wherein the middle frame comprises a third hook part being combined with the first hook part, wherein the third hook part and the first hook part do not laterally protrude further than an outer surface of the sidewall.

5. The LCD apparatus of claim 3, wherein
the sidewall portion combines with the first sidewall of the bottom chassis, wherein the driving circuit part is disposed between the sidewall portion of the top chassis and the first sidewall of the bottom chassis; and the top chassis further comprises a fourth hook part being combined with the second hook part, wherein the fourth hook part and the second hook part do not to laterally protrude further than an external edge of at least one of the second, third and fourth sidewalls of the bottom chassis having the second hook part.

6. The LCD apparatus of claim 5, wherein the second hook part is configured to be combined with the third hook part.

7. The LCD apparatus of claim 5, wherein the driving circuit part comprises:
   a driving circuit film disposed between the sidewall of the bottom chassis and the sidewall portion of the top chassis, and connected with the LCD panel; and
   a printed circuit board (PCB) connected with the driving circuit film and disposed on a lower surface of the bottom chassis.

8. The LCD apparatus of claim 3, the light-emitting unit comprises:
   a lamp unit disposed at edge portions of the receiving space and comprising a lamp generating light and a lamp cover covering portions of the lamp; and
   a light-guide plate guiding light from the lamp unit toward the LCD panel and disposed in the receiving space.

9. The LCD apparatus of claim 8, wherein the lamp cover comprises a sheet-fixing part protruding in an upward direction, for fixing the optical sheet.

10. The LCD apparatus of claim 9, wherein the optical sheet comprises a fixing hole receiving the sheet-fixing part.

11. The LCD apparatus of claim 9, wherein the lamp cover comprises:
   a first cover part covering an upper portion of the lamp;
   a second cover part extended from the first cover part and covering portions of the lamp; and
   a third cover part extended from the second cover part and covering portions of the lamp, wherein the first cover part comprises the sheet-fixing part.

12. The LCD apparatus of claim 11, wherein the first cover part comprises at least two sheet-fixing parts.

13. The LCD apparatus of claim 9, wherein the lamp unit comprises a first lamp unit and a second lamp unit respectively disposed at opposite edge portions of the receiving space.

14. A method of forming a liquid crystal display (LCD) apparatus comprising:
   forming a bottom chassis comprising a receiving space formed by sidewalls substantially vertically extended from edge portions of a bottom plate, the sidewalls comprising a first hook part and a second hook part recessed towards the receiving space;
   receiving a light-emitting unit in the receiving space;
   disposing an optical sheet on the light-emitting unit;
   combining a middle frame with the first hook part, the middle frame fixing edge portions of the optical sheet;
   disposing a display unit comprising an LCD panel on the middle frame and connecting a driving circuit part with the LCD panel; and
   combining a top chassis with the second hook part, the top chassis fastening edge portions of the LCD panel and comprising opening portions, wherein the opening portions of the top chassis correspond to remainders of the sidewalls of the bottom chassis except for a first sidewall of the sidewalls of the bottom chassis on which the driving circuit part is disposed.

* * * * *